(12) United States Patent
Clegg

(10) Patent No.: US 9,547,869 B2
(45) Date of Patent: Jan. 17, 2017

(54) MERCHANDISING PRODUCT WITH ONE-TOUCH CONNECTION WIRELESS COMMUNICATION

(71) Applicant: Americhip, Inc., Gardena, CA (US)

(72) Inventor: Timothy P. Clegg, Manhattan Beach, CA (US)

(73) Assignee: AMERICHIP, INC., Gardena, CA (US)

( * ) Notice: Subject to any disclaimer, the term of this patent is extended or adjusted under 35 U.S.C. 154(b) by 0 days.

(21) Appl. No.: 14/193,853

(22) Filed: Feb. 28, 2014

(65) Prior Publication Data

US 2014/0358689 A1 Dec. 4, 2014

Related U.S. Application Data

(60) Provisional application No. 61/829,371, filed on May 31, 2013.

(51) Int. Cl.
*H04B 1/38* (2015.01)
*H04M 1/00* (2006.01)
*G06Q 30/02* (2012.01)

(52) U.S. Cl.
CPC ................. *G06Q 30/0267* (2013.01)

(58) Field of Classification Search
CPC ............................ G06Q 30/02; G06Q 30/0267
USPC ................................................ 455/414.1, 557
See application file for complete search history.

(56) References Cited

U.S. PATENT DOCUMENTS

| 6,035,217 | A | 3/2000 | Kravitz |
| 6,919,923 | B1* | 7/2005 | Tanaka et al. ............. 348/220.1 |
| 8,312,651 | B2 | 11/2012 | Mandelbaum |
| 8,341,858 | B2 | 1/2013 | Clegg |
| 8,532,610 | B2 | 9/2013 | Manning Cassett |
| 2010/0198656 | A1* | 8/2010 | Soroka et al. ................. 705/10 |
| 2010/0223824 | A1* | 9/2010 | Mandelbaum et al. ........ 40/463 |

* cited by examiner

*Primary Examiner* — Ayodeji Ayotunde
(74) *Attorney, Agent, or Firm* — Francis D. Logan

(57) ABSTRACT

A device for making a one-touch connection wireless communication using a merchandising product with a marketing message. A merchant delivers a merchandising product to a user. The merchandising device contains an electronic module that comprises memory that stores multimedia and an identifier such as telephone number. The electronic module contains the components necessary to play the multimedia on an output device, such as a speaker or video screen. The electronic module also contains the components necessary to connect to a wireless network and to place a wireless communication using the wireless network to the identifier when a dial switch is triggered. The electronic module is activated by a main switch. In one embodiment, upon activation, the electronic module plays the multimedia on the output device. When the user triggers the dial switch, the module makes a wireless communication with the stored identifier. The wireless communication may be voice, text, e-mail and/or other digital data.

19 Claims, 14 Drawing Sheets

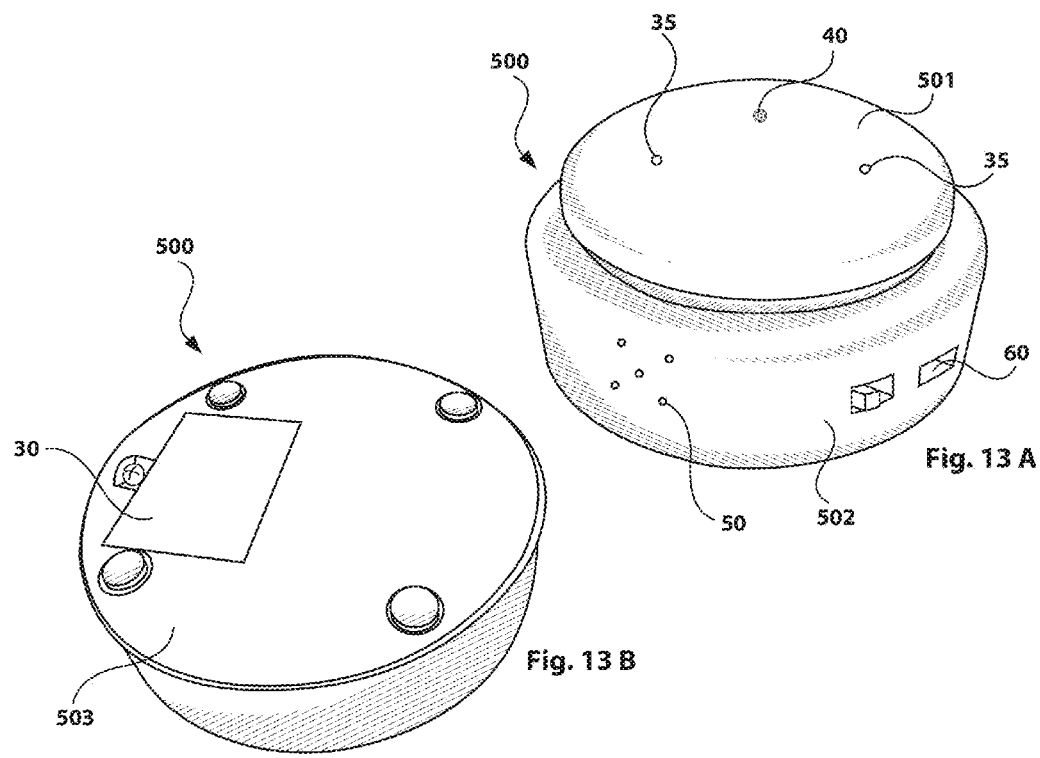
Fig. 13 A
Fig. 13 B
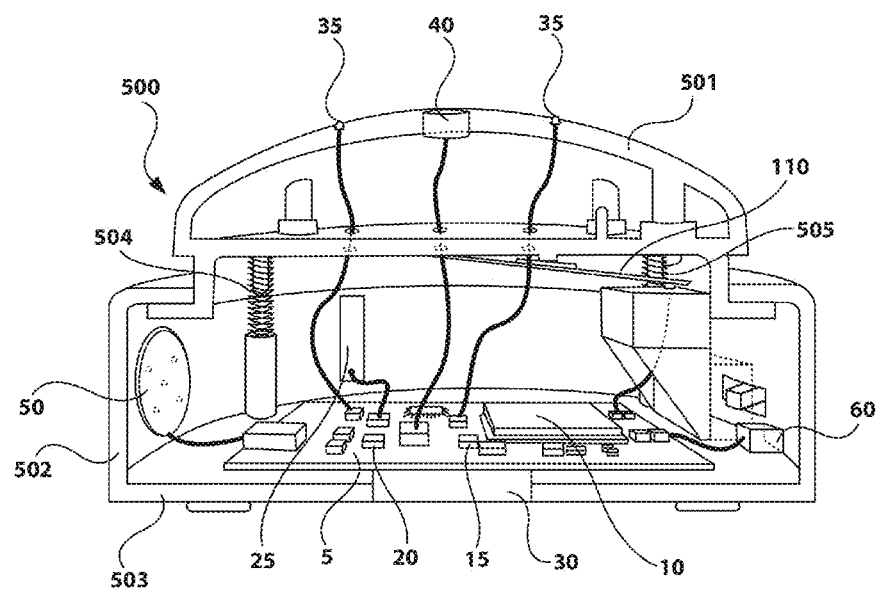
Fig. 13 C

MERCHANDISING PRODUCT WITH ONE-TOUCH CONNECTION WIRELESS COMMUNICATION

CROSS REFERENCE TO RELATED APPLICATION

This application claims the benefit of U.S. Provisional Application No. 61/829,731, filed May 31, 2013, and titled "Merchandising Product with Wireless Connectivity," which is incorporated by reference in its entirety.

This application incorporates by this reference the disclosure in U.S. patent application Ser. No. 14/104,926, entitled "Merchandising Product with Auto-Dial Cellular Communication" (Inventor: Timothy P. Clegg) in its entirety.

FIELD OF INVENTION

The present invention relates to the field of merchandising products and, in particular, to a merchandising product that can deliver multimedia marketing messages and that can make wireless communications upon a single touch by a user, and to methods for delivering and implementing wireless communications in merchandising products with one-touch connection functionality.

BACKGROUND OF THE INVENTION

Affordable and reliable wireless communications modules are revolutionizing communications. These modules are the backbone of mobile telephone and mobile computing industries. Except for the field of digital signage, the advertising industry has not incorporated wireless communications into its products. As cellular telephone technology has become widely available and widely used, marketers can take advantage of people's familiarity with cell phone technology to develop new ways of reaching their clients.

Thus, what is needed is a merchandising product that includes multimedia content stored in local memory and a wireless module, allowing the sender of the merchandising product or a third party to deliver a multimedia marketing message and also to have a live interactive exchange with the user of the product, to receive texts/data/e-mail from the user of the module, and to collect analytical information regarding the use of the product, where the merchandising product initiates the wireless communication to a pre-programmed digital identification number upon the press of a single switch.

SUMMARY

The present invention is a merchandising product with an embedded or attached electronic module that has the capability of establishing a wireless connection with a wireless telecommunication network upon activation of the module and of making a wireless communication with one of the digital identification numbers pre-stored in the module's memory by the user pressing one of the one or more dial switches placed on the product (the "one-touch connection wireless device"). One preferred embodiment of the wireless communication is a telephone call. Other embodiments include the sending of a text message, data or e-mail. The digital identification number to be contacted is, in a preferred embodiment, a telephone number. In other embodiments, the digital identification number may be any alpha-numeric/symbolic string of characters that is used in the context of wireless communications to identify an intended recipient of a communication. The module further has the capability of tracking data regarding the usage thereof as a communication device.

"Merchandising products" include flat, foldable and three-dimensional display cards, greeting cards, card holders, mailers, invitations, desktop calendars, desktop displays, magazine inserts, brochures, corporate communications and training materials, handouts, photo books, pop-up books, novelty items, in-store displays and similar products comprising a structure with one or more marketing messages thereon and in which the electronic module can be embedded.

A "marketing message" includes any form of marketing, advertising copy and artwork, including but not limited to text, graphics, sound, design, trademarks and trade dress.

The electronic module comprises memory that may store audio only content, visual only content, such as still images, graphics, photographs, text, and/or video, and/or combined audio and visual content (audio only, visual only, and combined audio and visual content is referred to collectively as "multimedia"). The multimedia may include any content capable of being seen and/or heard. The processor may play the multimedia stored in the memory ("local multimedia") before, during and/or after the processor attempts to establish a wireless connection. (Each individual segment of multimedia is referred to herein as a "file".) The memory may contain no, one or a plurality of local multimedia files. Local multimedia files can be as short as a single note or image or as long as the local memory will hold. The multimedia files may be played in sequential order or in random order. The one-touch connection wireless device may include switches to select the multimedia for playback and to control the manner of playback.

The local multimedia can be selected or created by the sender of the merchandizing product, or created and provided by a third party content vendor. The local multimedia may be loaded into the memory by any suitable data connection or transfer device, including wired or wireless internet or network connection, or portable data storage device such as USB, flash drive, compact flash, or smart card wherein the data is transferred via an industry-standard card interface or other data transfer protocol.

The marketing message contained on the one-touch connection wireless device along with the local multimedia and the wireless communication(s) placed by the electronic module may provide a related marketing message to the user.

In a preferred embodiment, the wireless network is a cellular telecommunications network for carrying voice and/or data. In other embodiments, the wireless network is any existing or future telecommunications network that permits wireless communications. Preferred embodiments of the service provided by the embedded wireless module include audio-only telephone service, telephone service with one-way and two-way video, video messaging, text messaging, e-mail, and data exchanges. The wireless connection can also be used to transmit and receive data about the usage of the one-touch connection wireless device and other analytics.

The one-touch connection wireless device includes an electronic module activated by a switch (the "main switch"), both housed within the device. The electronic module comprises a processor, digital memory, a modem, an antenna, an output device, one or more secondary switches and a power source and in particular embodiments may further comprise a microphone and/or a power/data port. The digital memory may contain at least one local multimedia file and may contain multiple local multimedia files. The digital memory also contains one or more digital identification numbers, such as a telephone number. (While the preferred embodiment comprises a telephone number, this disclosure specifically encompasses future digital identification numbers used in any type of wireless communications.) The functionality of the secondary switches includes contacting a pre-programmed digital identification number (a "dial switch"), selecting a multimedia file for playback (a "chapter switch") and controlling the playback of multimedia, including volume increase, volume decrease, brightness increase, brightness decrease, rewind, pause and fast-forward ("multimedia switch").

The output device may be used for playback of audio content (an "audio output device") or for playback of visual content (a "visual output device"). Audio output devices comprise speakers, earphone jacks and similar technology that allow an individual to hear audio content. Visual output devices comprise video screens, video touchscreens and similar technology that allow an individual to see visual content. Audio output devices and visual output devices are referred to collectively as "output devices".

Each dial switch is associated with a particular digital identification number. When the module is activated and the modem is not otherwise in use (sending and receiving analytics, or sending and receiving another wireless communication), then when the user of the one-touch connection wireless device presses one of the one or more dial switches the module places a wireless communication to the digital identification number associated with that switch. The wireless communication may be a wireless telephone call, a text message, an email and/or other data. In embodiments other than the wireless telephone call, the memory further comprises the digital content to be sent from the one-touch connection wireless device to the called digital identification number. The digital content to be sent may be different for each digital identification number, or more than one digital identification number may receive the same digital content. In these embodiments, upon placing a wireless communication to the identification number, the processor sends the stored content to that number.

Chapter switches may be programmed to select a particular multimedia file for playback. In this embodiment, an individual chapter switch would select a pre-determined multimedia file for playback. Alternatively, chapter switches may be programmed to allow a user to scroll through multimedia files. In this embodiment, pressing a chapter button would change the multimedia file selected for playback from one to another depending on how the files were stored (e.g., alphabetically).

Multimedia switches may be programmed to control multimedia playback functions. Multimedia media playback functions that may be controlled by multimedia switches include stop, pause, fast-forward, rewind, volume up, volume down, brightness up and brightness down. Pressing the "stop" multimedia switch terminates the playback of the selected multimedia. Pressing the "pause" multimedia switch a first time during playback pauses the playback of the selected multimedia. Pressing the "pause" multimedia switch a second time resumes playback. Pressing the "fast-forward" switch a first time during playback accelerates playback. Pressing the "fast-forward" switch a second time during playback returns the playback to its earlier speed. Pressing the "rewind" switch a first time during playback reverses playback. Pressing the "rewind" switch a second time during playback returns the playback to normal play. Pressing the "volume up" switch increases the volume of sound of the playback heard at the audio output device. Pressing the "volume down" switch increases the volume of sound of the playback heard at the audio output device. Pressing the "brightness up" switch increases the brightness of the video screen. Pressing the "brightness down" switch decreases the brightness of the video screen.

The one-touch connection wireless device may further comprise one or more video screens, and may further comprise a camera. In this set of particular embodiments, the electronic module may receive digital video as part of the wireless communication and display the video on the one or more screens. The one-touch connection wireless device further may obtain digital video from the camera included therein and may send that video as part of the wireless communication and may display that video on the one or more screens. In a particular embodiment, at least one of the one or more screens is a touch screen. In this particular embodiment, the touch screen may be used during the wireless communication to enhance communications options with the counterparty to the call.

For each of the one-touch connection wireless device embodiments, the electronic module may further comprise one, two or more than two LEDs. The module may illuminate a single LED in order to indicate that the module has successfully detected and connected with a wireless network. The module may illuminate one of two LEDs to indicate that the module is on but no connection to a wireless network is available, and may illuminate the second of two LEDs to indicate that the module is on and a connection to a wireless network has been made. The module may illuminate one or more of the plurality of LEDs to indicate the strength of the wireless network signal.

For each of the one-touch connection wireless device embodiments, the electronic module may further comprise a location determining module, such as a global positioning satellite (GPS) module. The electronic module may determine the location of the device at any time that the module is activated and may communicate that information to a third party as part of a wireless communication or as part of sending analytics.

For each of the foregoing representative embodiments, the structure of one-touch connection wireless device may be any container in which the electronic module may be embedded or attached. Containers may be of any size and shape suitable for the intended use of the product. Exemplars of such containers include flat cards, foldable cards, booklets, books, cubes of varying height, width and depth, cubes with lids, boxes (i.e., a cube with access to the interior) with attached and detachable lids, multi-page books, various asymmetrical shapes and combinations of the foregoing. In some embodiments, the main switch will require direct manual operation to activate and deactivate the module.

The one-touch connection device container may be, entirely or in part, in the form of two or more interconnected panels or other components of paper, plastic or any other suitable material that are foldable, slideable, and/or rotatable (collectively, "moveable") with respect to each other. In embodiments including moveable panels, the container will have a closed configuration in which the module is off and an open configuration in which the module is activated. The main switch may be triggered on and off by the act of moving one panel with respect to another. The main switch in these embodiments may be any device suitable for using the motion of a panel for triggering the electronic module (e.g., a slide tongue or a magnet).

In certain embodiments, a switch may open and close by detecting changes in the environment, such as light sensor, motion sensor, touch sensor, pressure switch, radio frequency sensor, and audio sensor switches. Any switch may also be virtual switch, in that it is represented on a video touchscreen and the user activates the switch by taking some action, such as swiping or touching, that is recognized by the touchscreen.

For each of the foregoing representative embodiments, in a particular embodiment the processor may gather user analytics data, including but not limited to identification code of the one-touch connection wireless device, date, time and location of use of the product, digital identification number contacted, frequency of use, length of use, digital content sent and received, and characteristics of any failed communications. In a particular embodiment, the electronic module may send a batch of user analytics data to a third party on a particular schedule, or at any time while the one-touch connection wireless device is activated. In a particular embodiment, the electronic module may send user analytics data to a third party concurrently with any use of the one-touch connection wireless device that generates user analytics data.

BRIEF DESCRIPTION OF THE DRAWINGS

The present invention may be more readily understood by referring to the accompanying drawings, in which like numerals refer to like parts, and in which:

FIGS. 13A, 13B and 13C illustrate external views of a particular configuration.

DETAILED DESCRIPTION OF PREFERRED EMBODIMENTS

Figure 1:
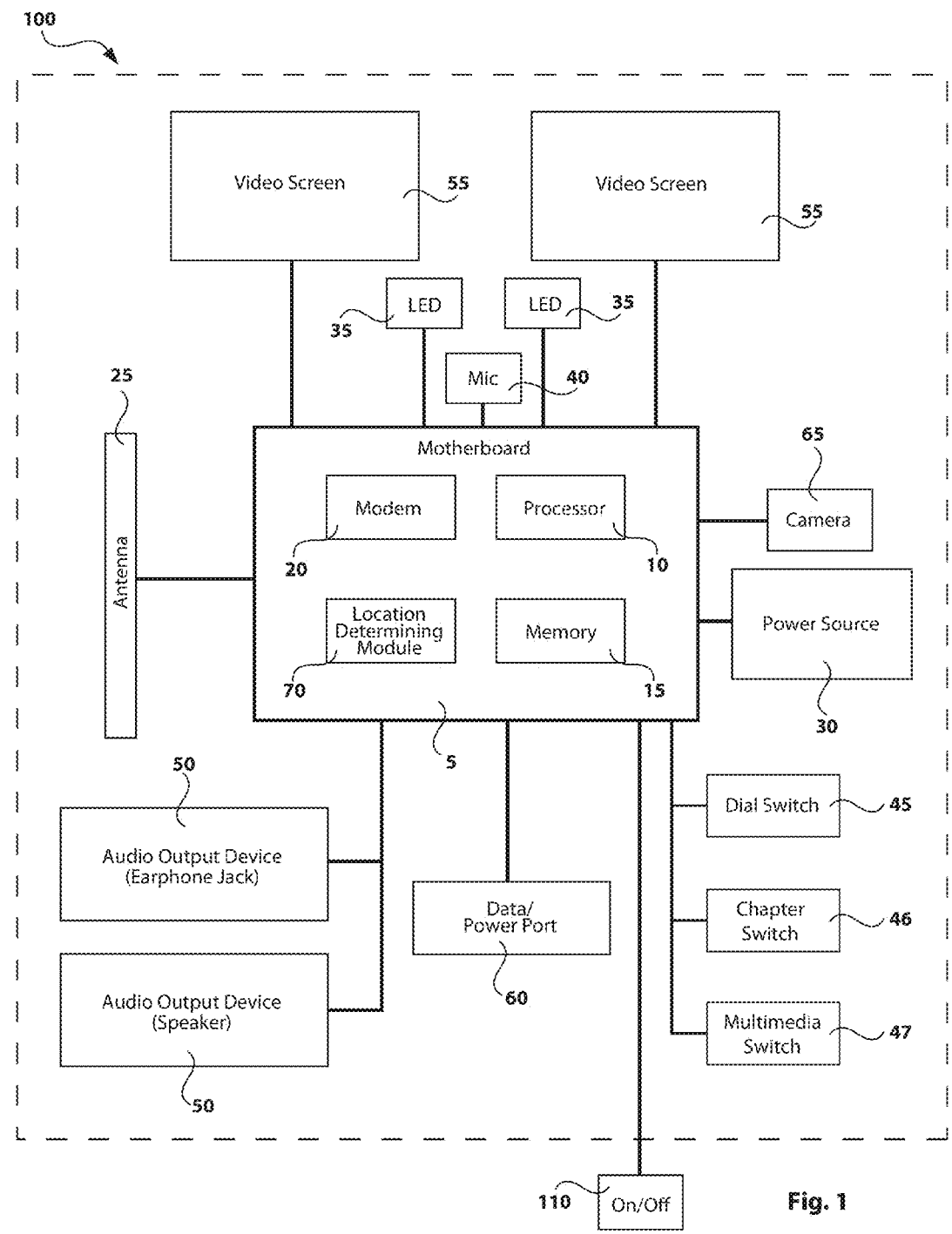
FIG. 1 is a schematic of an embodiment of an electronic module in an embodiment of the present invention.

Referring to FIG. 1, a schematic of the electronic module 100 of a preferred embodiment of the present invention is shown. In this embodiment, the electronic module 100 comprises a processor 10 as the central processing unit, a digital memory 15, a modem 20, an antenna 25, a power source 30, one or more LEDs 35, a microphone 40, one or more dial switches 45, one or more chapter switches 46, a plurality of multimedia switches 47, one or more audio output devices 50, one or more video screens 55, a combined data/power port 60, a camera 65, and a location determining module 70. The processor 10, the memory 15, the modem 20 and the location determining module 70 may be mounted on the board 5. The electronic module 100 is activated by a main switch 110 (i.e., once the main switch 110 is triggered to its closed position, electrical current flows through the module allowing the various components to function as intended in accordance with their design). The components are operatively connected as to create a device that functions as intended. In an alternative embodiment (not shown) a dedicated power port 61 and dedicated data port 62 are provided in lieu of the combined data/power port 60.

The processor 10 is any commercially available central processing unit, such as an ARM architecture microcontroller, programmed with software and/or firmware required to give the module the desired functionality. The processor 10 is activated by a main switch 110 mounted on or in the one-touch connection wireless device. As used herein, switch includes a slide switch, toggle switch, rocker switch, slide tongue, pressure switch, push switch, solar cell, magnets, light sensors, motion sensors, vibration trigger, tilt trigger, virtual switch embodied in a touchscreen or the like; however, any device known in the art that can cause a circuit to close and let power flow through can be used. In certain embodiments, in which the one-touch connection wireless device includes two or more moveable panels, the main switch 110 may be attached to the panels of the product in such a manner that the movement of one panel with respect to another beyond a certain position will activate the switch. In other embodiments the main switch 110 may require manual operation by the user of the product. In other embodiments the main switch 110 may open and close in response to environmental conditions.

The memory 15 is one or more digital data storage devices, including but not limited to memory cards, compact flash memory cards, secure digital and secure digital high capacity cards. The memory 15 may be separate from the processor 10 or integrated with it in a microcontroller or similar integrated device.

The modem 20 is any device that provides for digital communication over a wireless network including but not limited to WiFi, GSM and CDMA technology. This disclosure also specifically encompasses future wireless network technologies. The antenna 25 is any device that receives and transmits the radio waves needed for the modem to establish a connection with a wireless network. The modem 20 and antenna 25 may be separate from the processor 10 or integrated with it in a microcontroller or similar integrated device.

The module is powered by a power source 30. In a preferred embodiment, the power source is comprised of batteries of sufficient size to power the module and software and other power-consuming devices such as the output devices. However, any miniature mountable power source of sufficient power may be used such as, but not limited to, solar cells, direct drives, mechanically driven drives and the like. The preferred batteries used to power the device are of sufficient capacity as to allow the device to be operated repeatedly for several months. In a preferred embodiment, the batteries are laid flat and mounted on the same module board containing the processor. In a preferred embodiment, the batteries are rechargeable. In this embodiment, the batteries are recharged by connecting the device to an external power source via an AC or DC connector port 61 or via a combined data/power port 60 such as a USB port. Alternatively, the power source may be external to the product and the product is powered by connecting the product to the external power source via a power connector port 61 or a combined data/power port 60.

The one or more light emitting diodes (LEDs) 35 are any commercially available LED suitable for embedding in a one-touch connection wireless device that provide visible light in ordinary ambient light conditions at a range of three to six feet from the device.

The microphone 40 is a commercially available microphone suitable for embedding in a one-touch connection wireless device. The processor 10 is configured with the drivers needed to operate the microphone 40. In a preferred embodiment, the microphone 40 and its drivers are configured to capture human voices which are clearly audible within a range of three to six feet from the device.

The dial switches 45, chapter switches 46, and multimedia switches 47 are preferentially button switches but may be any device known in the art that can cause a circuit to close and let power flow through.

In a preferred embodiment, the one or more audio output devices 50 are one or more commercially available audio speakers and associated audio amplifiers suitable for embedding in a one-touch connection wireless device. In a preferred embodiment, the speakers and their associated audio amplifiers 50 are configured to generate sound levels which are clearly audible within a distance of three to six feet from the speakers. The processor is configured with the drivers needed to operate the speakers. The speakers and drivers 50 may be configured to play audio stored in any standard audio file format. In another preferred embodiment the audio output device 50 is an earphone jack. In this embodiment, the earphone jack 50 may be either in addition to or in lieu of the one or more speakers and associated audio amplifiers, and the processor is configured with the drivers needed to create audible sound in earphones when the earphones are plugged into the earphone jack 50.

The one or more video screens 55 are any type of image display device capable of display of static and video images. One example of a suitable device is a liquid crystal display. Other types of displays that may be used in accordance with this disclosure include STN LCD, TFT LCD, CSTN, OLED/PLED, FED or SED. Video display formats may include MPEG4, MJPEG, or any other suitable format. In embodiments comprising a touchscreen video screen, industry-standard touchscreens may be used.

The combined data/power port 60 is any industry standard connector allowing for data to be transmitted between the module and an external device while charging the internal batteries 30, such a USB port. The power charging port 61 may be a separate connector dedicated solely to providing power to the power source 30. The dedicated data port 62 is any connector allowing for data to be transmitted between the module and an external device.

The camera 65 is any commercially available digital camera suitable for embedding in a one-touch connection wireless device.

The location determining module 70 is any industry-standard component for determining the location of the device, such as a global positioning satellite detection (GPS) module.

Not all embodiments of the invention will include all these components. In various preferred embodiments, the electronic module may comprise one or more audio output devices 50 without any visual output device such as a video screen 55, or one or more visual output devices such as a video screen 55 without any audio output device 50, or both at least one audio output device 50 and visual output device such as a video screen 55. In other preferred embodiments, such as embodiments which do not include the ability to make voice calls, the electronic module 100 may not include the microphone 40. In embodiments which include the capability to make voice calls, the electronic module comprises the microphone 40.

In various embodiments some of the components of the electronic module may be consolidated. Existing microcontrollers comprise both the processor 10 and the memory 15 on a single chip. Future microcontrollers may further comprise the modem 20, antenna 25, and/or location-determining module 70 and/or other components. Such consolidated devices are explicitly encompassed by this disclosure.

The processor 10 manages both the playback of multimedia and wireless communications. Wireless communications include the transmission of voice, video, text messages, emails, other data packets or combinations thereof.

In multimedia playback, the processor 10 is used to access and play back a multimedia file. In one preferred embodiment, before the one-touch connection wireless device is delivered to an end user, the processor 10 is pre-programmed to access and play a specified multimedia file immediately upon the activation of the electronic module by the user without any further action by the user ("multimedia autoplay at start-up"). In another preferred embodiment, the processor 10 is pre-programmed to access and play a specified multimedia file immediately upon user initiating a wireless communication by pressing a dial switch ("multimedia autoplay at dial-up"). In another preferred embodiment, the one-touch connection device is delivered to the end user with both multimedia autoplay at start-up and multimedia autoplay at dial-up functionality. In another preferred embodiment, the one-touch connection device is delivered to the end user with neither multimedia autoplay at start-up nor multimedia autoplay at dial-up functionality.

Playback of multimedia can be instituted either through the multimedia autoplay functionality or by a user selecting a chapter switch 46. In one preferred embodiment, each chapter switch 46 is associated with a particular multimedia file stored in the local memory. In an alternative preferred embodiment, the chapter switches 46 are programmed to allow the user to scroll through the locally stored multimedia files and select one for playback. Once a multimedia file has been selected for playback, the processor 10 accesses that data file stored in the local memory 15. Common file types include mp3, AAC, FLAC, Monkey Audio, WMA, mp4, AMV, MPG, MJP, MPEG, ANI, AVI and WMV, but this disclosure expressly encompasses future multimedia file types. The processor 10 is programmed to stream the audio content of the file, if any, to the one or more audio output devices 50 (if an audio output device is provided in that particular embodiment of the one-touch connection wireless device) and the visual content of the file, if any, to one of the video screens 55 (if a video screen is provided in that particular embodiment of the one-touch connection wireless device).

The wireless phone embodiment of the present invention enables a user to initiate, terminate and receive wireless telephone calls. FIG. 2 illustrates the flow diagram of the steps involved in performing the call initiation phone function.

Figure 2A:
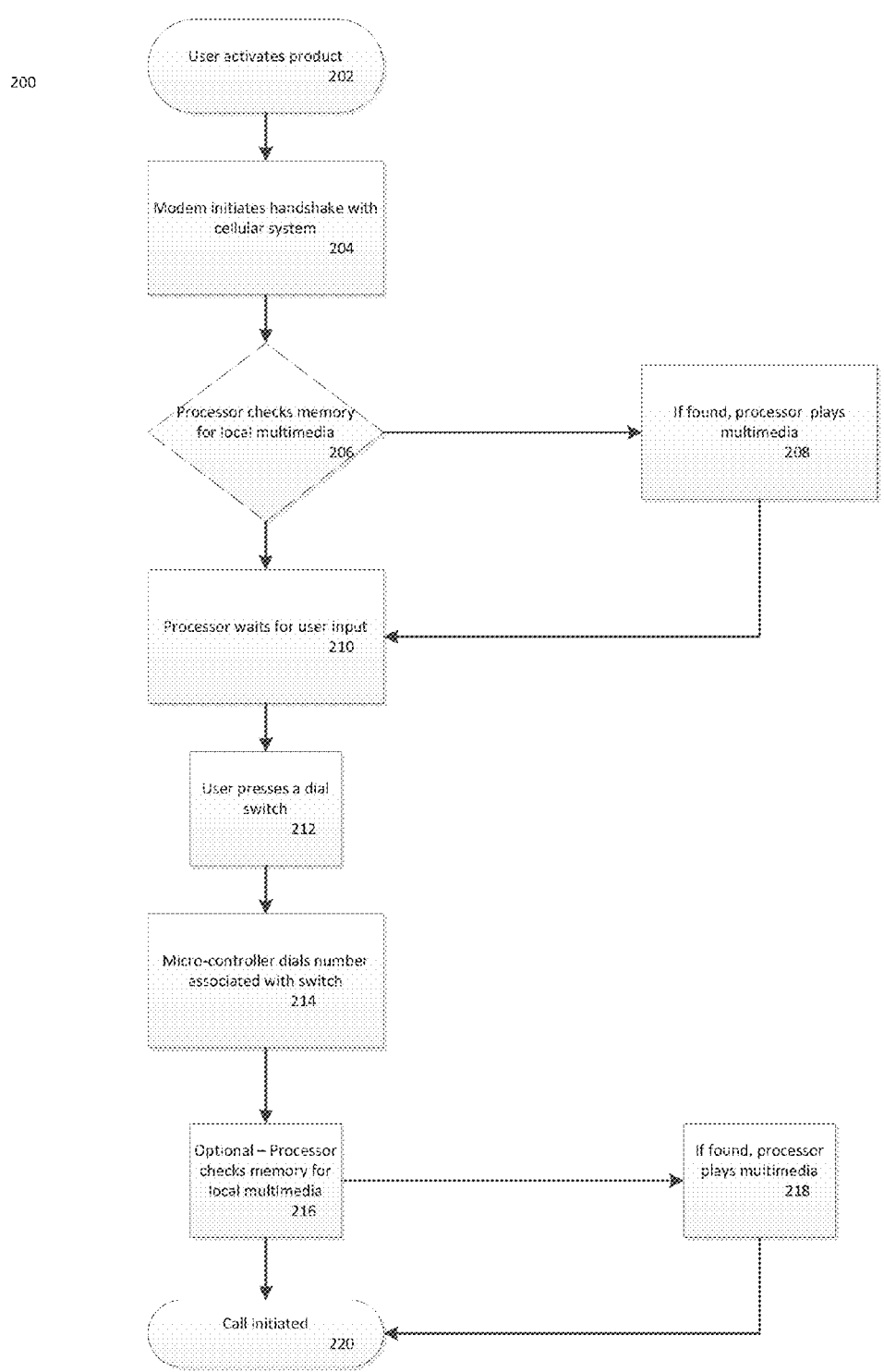
FIGS. 2A and 2B illustrates a flow diagram of the steps involved in making a call in the wireless phone embodiment of the one-touch connection wireless device.
Figure 2B:
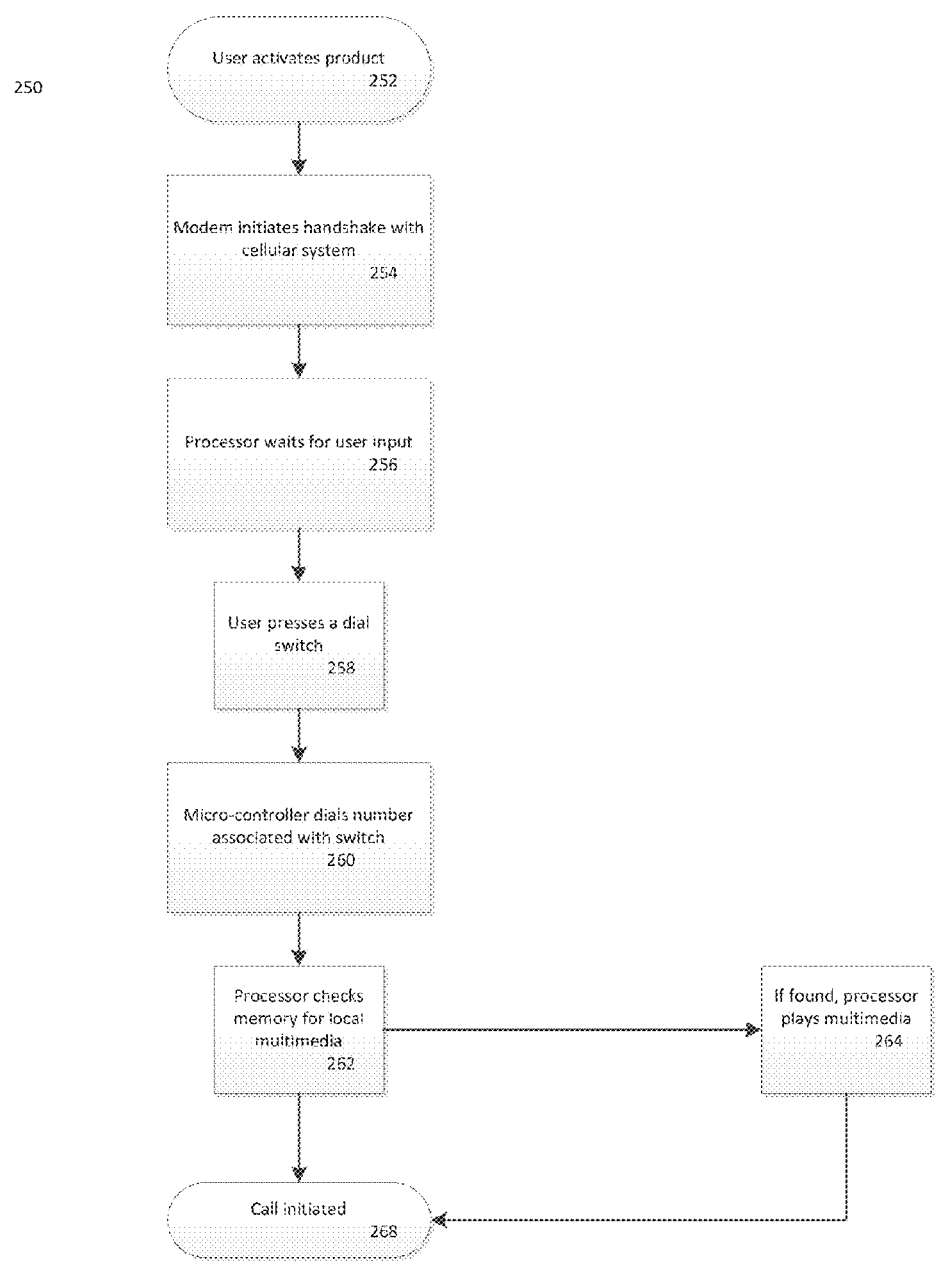

FIGS. 2A and 2B illustrate flow diagrams 200 and 250 of the steps involved in making a call through the multimedia autoplay at startup and multimedia autoplay at dial-up functionality respectively of the wireless phone embodiment of the one-touch connection wireless device. Referring to FIG. 2A, in the multimedia autoplay at startup embodiment, to make the call the user in step 202 provides power to the processor 10 from the power source 30 by closing the main switch 110. Upon receiving power, in step 204 processor 10 sends a signal to the modem 20 to search for a wireless phone network and, once the modem 20 indicates that a suitable network has been found, initiates a handshaking protocol with the network. Also upon receiving power, in step 206 the processor 10 accesses the memory 15 to search for the local multimedia file, if any, stored in the memory 15 which is to be played at start-up. If this local multimedia file is found, in step 208 the processor 10 plays the local multimedia on the available output devices (i.e., audio output device 50 and/or 55). Upon completing the handshake with the wireless network and upon finishing playing the local multimedia, if any, in step 210 the processor 10 waits for further user input. In step 212, the user presses one of the dial switches 45. In step 214, the processor 10 looks up the digital identification number in the memory associated with that dial switch and places a wireless telephone call to that number. In step 216, if the device is also configured with multimedia autoplay at dial-up functionality, while the call is being connected the processor 10 accesses the memory 15 to search for the local multimedia file, if any, stored in the memory 15 which is to be played at dial-up. If this local multimedia is found, in step 218 the processor 10 plays the local multimedia on the available output devices (i.e., audio output device 50 and/or 55). In step 220, the call is connected and the user may have a dialogue with the counterparty to the call.

Referring to FIG. 2B, in the multimedia autoplay at dial-up only embodiment, to make the call the user in step 252 provides power to the processor 10 from the power source 30 by closing the main switch 110. Upon receiving power, in step 254 processor 10 sends a signal to the modem 20 to search for a wireless phone network and, once the modem 20 indicates that a suitable network has been found, initiates a handshaking protocol with the network. Upon completing the handshake with the wireless network and upon finishing playing the local multimedia, if any, in step 256 the processor 10 waits for further user input. In step 258, the user presses one of the dial switches 45. In step 260, the processor 10 looks up the digital identification number in the memory associated with that dial switch and places a wireless telephone call to that number. In step 262, while the call is being connected the processor 10 accesses the memory 15 to search for the local multimedia file, if any, stored in the memory 15 which is to be played at dial-up. If this local multimedia is found, in step 264 the processor 10 plays the local multimedia on the available output devices (i.e., audio output device 50 and/or 55). In step 268, the call is connected and the user may have a dialogue with the counterparty to the call.

In a wireless telephone call, during transmission mode, the microphone 40 captures the user's voice, converts the voice to voice signals and relays those signals to the processor 10. The processor 10 sends the voice signals to the modem 20 which transmits the voice signals through the antenna 25 to a remote station. During receiving mode, the modem 20 receives voice signals through the antenna 25 from a remote station and passes those signals to the processor 10. The processor 10 then passes the received voice signal to the audio output device 50, which generates an audible signal for the user's hearing. In embodiments including a camera, the camera 65 may pass a video signal to the processor 10. The processor 10 sends the video signal along with the voice signal to the modem 20 which transmits the voice and video signal through the antenna 25 to a remote station. In certain embodiments with one or more video screens, the modem 20 may receive video signals along with the voice signals through the antenna 25 from a remote station. If a video signal is received, the modem 20 passes the combined voice and video signal to the processor 10. The processor 10 then passes the received video signal to one or more video screens 55, which generates a visual image on the screen. The processor 10 may also show the video signal received from the camera 65 on one of the screens 55. In a preferred embodiment, one of the screens may be a touchscreen. In this embodiment, the electronic module is programmed to recognize touches on the touchscreen, and send the data generated by a touch on the touchscreen to the counterparty to the call.

Calls may be terminated in a variety of ways. A call can always be terminated by the user opening the main switch 110. Opening the main switch 110 disconnects power from both the processor 10 and the modem 20. The processor then powers down, terminating the call. Depending on the particular configuration, a call may also be terminated by pressing the dial switch 45 used to initiate the call only, or by pressing any dial switch 45 only, or by pressing any dial switch 45 or chapter switch 46. The processor 10 is configured to detect such switch presses while a call is occurring and to terminate the call and power down the modem 20 as a result of that switch press.

Wireless calls may be received in particular wireless phone embodiments of the present invention. In these embodiments the processor 10 is programmed to receive calls when the modem 20 is not already in use handling another call. When an incoming call is detected, the processor 10 terminates any multimedia then playing and generates an indicator, such as a tone or a visual effect, which notifies the user of the incoming call. The user may then elect to receive the call by pressing a dial switch 45.

In other preferred embodiments, the wireless communication is a text message, an email, a packet of data or a combination thereof, but not a telephone call. In these embodiments, the memory 15 further comprises one or more text messages, emails and/or other data packets. In the basic configuration, each dial switch 45 will be associated both with a digital identification number and a text message, email or other data packet. In more advanced configurations the user will be able to select among the stored text messages, emails and/or other data packets which to send to a digital identification number. When the user presses a dial switch 45, instead of placing a wireless call to that number, the one-touch connection wireless device sends the selected text message, email, data packet or combination thereof stored in the memory 15 to the digital identification number also stored in the memory 15 associated with that dial switch 45. If the processor 10 is also programmed to send analytics (as discussed below) then the module 100 will also send the analytics to that digital identification number, or to another digital identification number stored in local memory. Upon completing these tasks, the processor will disconnect from the wireless network.

In a preferred embodiment, one or more LEDs 35 are visible to the user of the one-touch connection wireless device. In the single LED configuration, the LED 35 may illuminate if the electronic module 100 is able to successfully complete the handshake with a wireless network. In a two-LED configuration, one LED 35 may illuminate if the module is on but unable to connect to any wireless network, and the other LED 35 may illuminate the module is on and has successfully connected to a wireless network. In the multiple-LED configuration, a certain number of LEDs 35 may illuminate based on the signal strength of the wireless network.

In a preferred embodiment, the electronic module 100 comprises a location determining module 70, such as a global positioning satellite (GPS) module. The electronic module 100 may determine the location of the one-touch connection wireless device at any time that the module is activated and may communicate that information to a third party as part of a wireless communication or as part of sending analytics.

In all embodiments, the processor 10 may include programming that collects data regarding the use of the one-touch connection wireless device for wireless communications (generically, "analytics"). Data comprising analytics may include the processor's own identification code, date, time, location, and duration of a particular use, digital identification number contacted, type of use, any query made by the user, any data sent to the user, any response by user to data sent, any data entered by the user, total number, frequency and type of uses, and number, type, identity and other characteristics of any failed interactions. Analytics may further comprise the precise location of the device during each use if the electronic module 100 comprises a location determining module 70.

The processor 10 may include programming that stores analytics in the memory 15, and/or that sends analytics data immediately upon collection to a server. In a particular embodiment, the electronic module 100 may send a batch of user analytics data to a third party on a particular schedule, or at any time when the processor is activated. In a particular embodiment, the electronic module 100 may send user analytics data to a third party concurrently with any use of the one-touch connection wireless device that generates user analytics data.

FIGS. 3 through 13 disclose the forms of various preferred embodiments of one-touch connection wireless devices.

Figure 3:
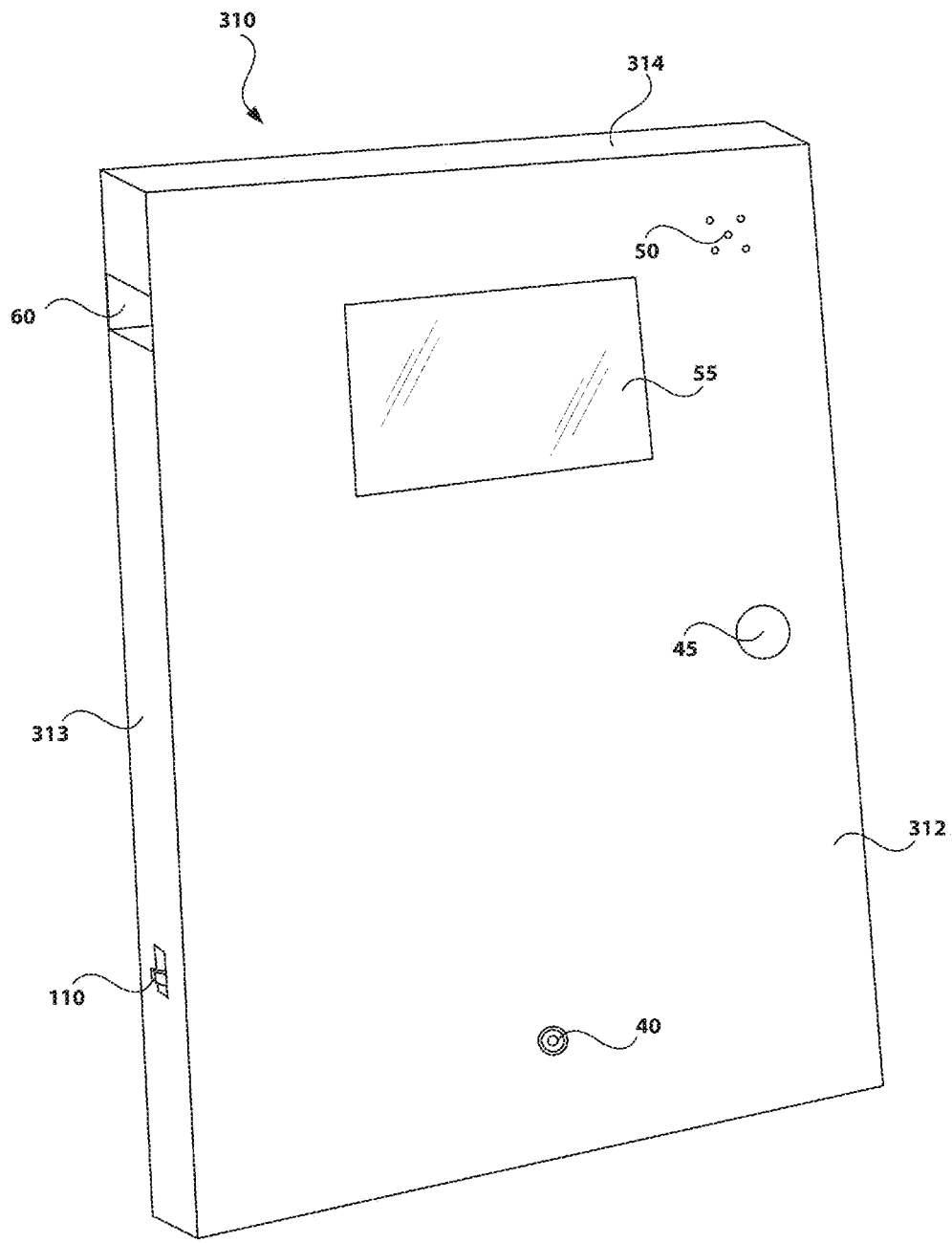
FIG. 3 illustrates an external view of a particular configuration.
Figure 4:
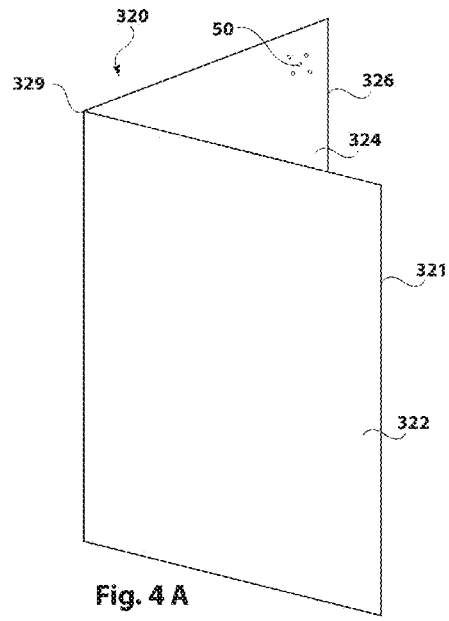
FIGS. 4A, 4B and 4C illustrate external views of a particular configuration.
Figure 4:
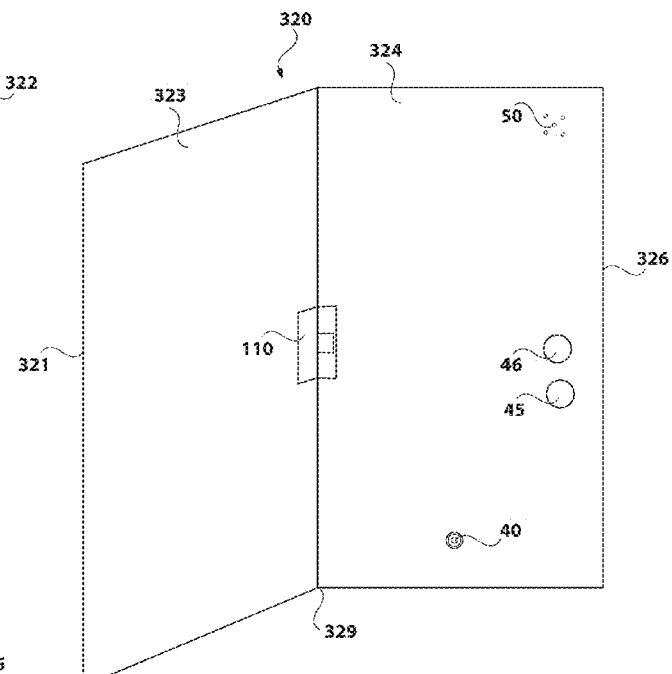
Figure 4:
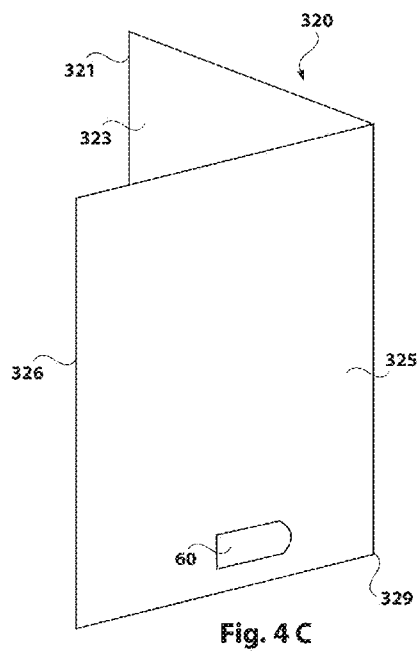
Figure 5:
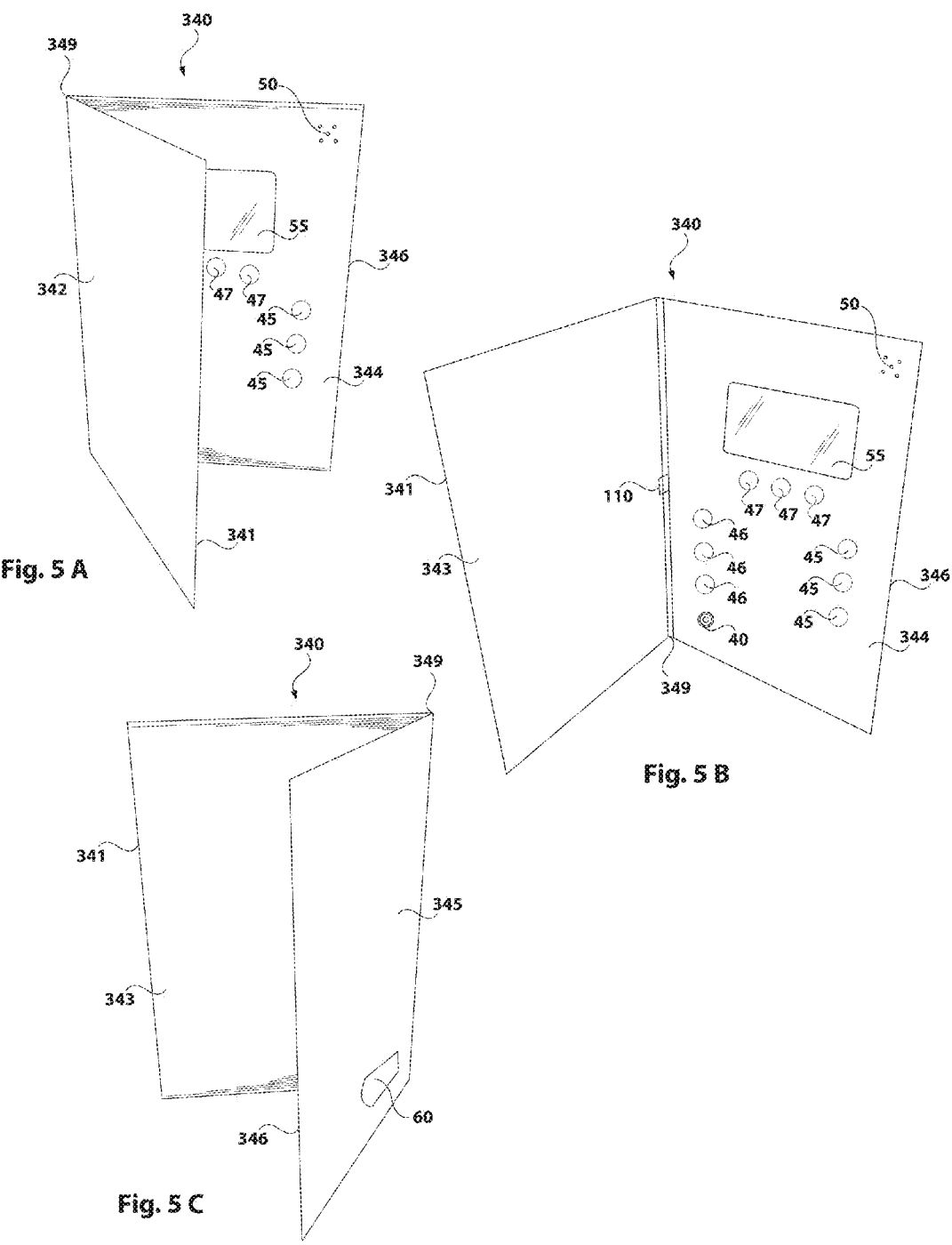
FIGS. 5A, 5B and 5C illustrate external views of a particular configuration.
Figure 6:
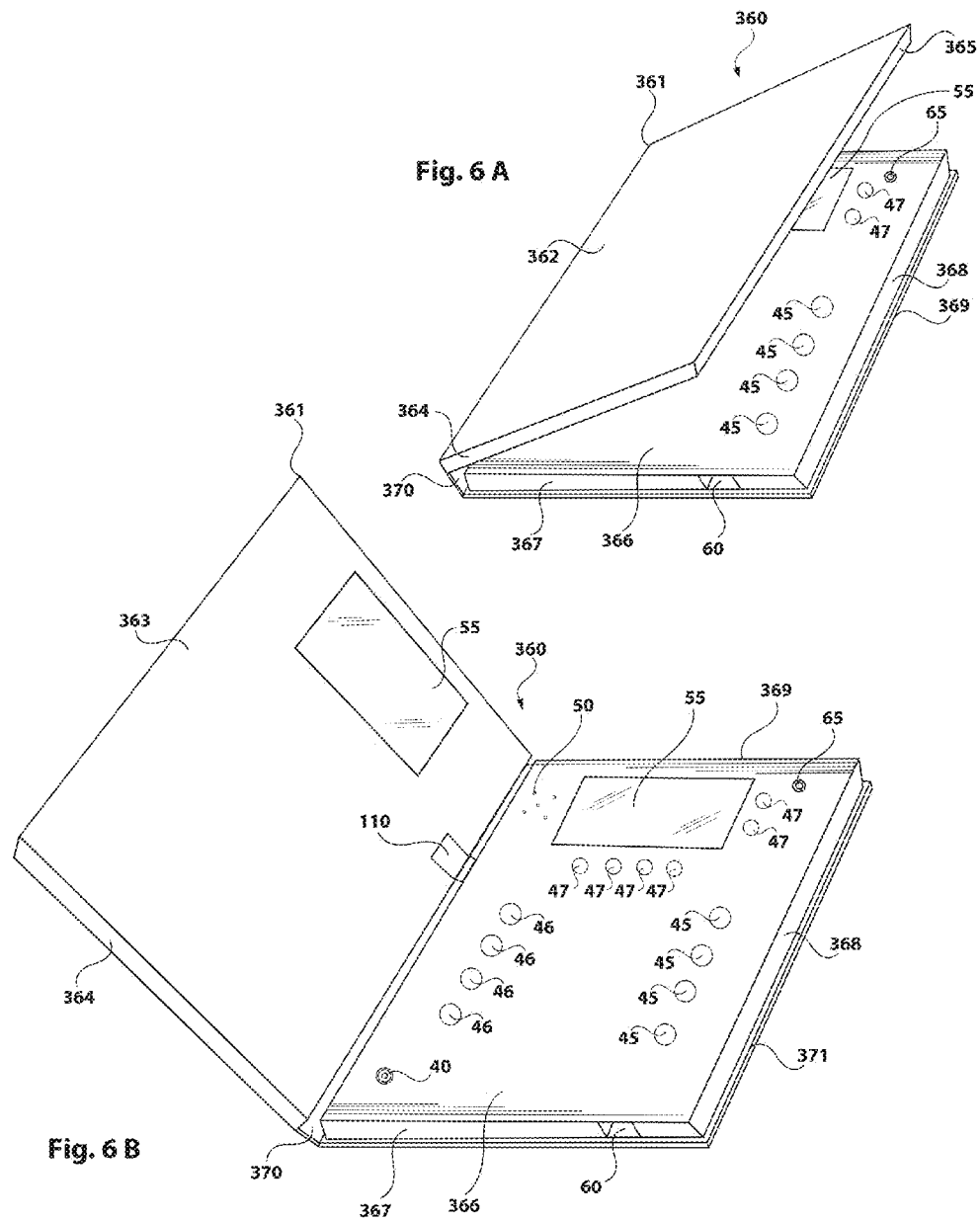
FIGS. 6A and 6B illustrate an external view of a particular configuration.
Figure 7:
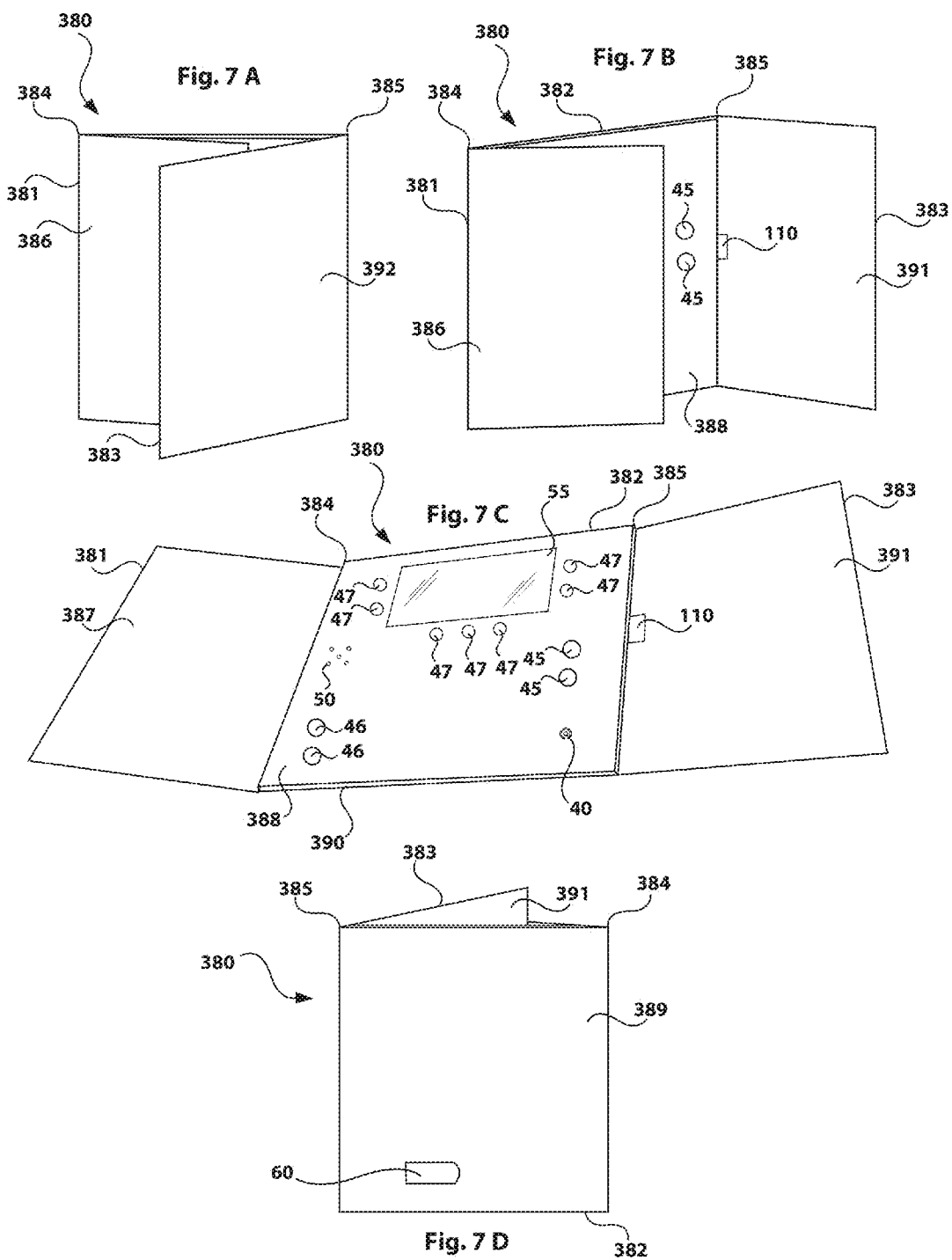
FIGS. 7A, 7B, 7C and 7D illustrate an external view of a particular configuration.

FIG. 3 illustrates one perspective of a flat card construction of the present invention, in which the card 310 has a front 312, a back (not shown) and an edge between the two, shown in FIG. 3 as a top edge 314 and a side edge 313. The front 312 has die cuts for the microphone 40, a dial switch 45, a speaker 50, and a video screen 55. The main switch 110 is located in the side edge 313 and in this embodiment is a manually-operated toggle switch. A die cut for the combined data/power port 60 is also located in the side edge 313. In alternative embodiments, the die cuts in the side edge 313 may be located on the top edge 314, the opposite side edge (not shown) and/or bottom edge (not shown). One or more marketing messages may be placed on any of the front panels 312 and back panel.

FIGS. 4A, 4B and 4C illustrate three perspectives of an embodiment of a moveable card construction of the present invention, in which card 320 has a first panel 321 and a second panel 326 joined along a fold line or hinge 329. The first panel 321 has an outside face 322 and an inside face 323. The second panel 326 has an inside face 324 and an outside face 325. The electronic module 100 is embedded inside the second panel 326. Die cuts in the inside face 324 of the second panel 326 are shown for the microphone 40, the audio output device 50, which in this embodiment is a speaker, a dial switch 45, and a chapter switch 46. A die cut in the outside face 325 of the second panel 324 is shown for access to the combined power/data port 60. The main switch 110, which in this embodiment is a slide switch, is placed across the hinge 329. The electronic module 100 is activated by the main switch 110. In this embodiment, the slide tongue main switch 110 activates the electronic module 100 upon the opening of the card, and deactivates the electronic module 100 by the closing of the card. One or more marketing messages may be placed on any of the four panels 322, 323, 324 and 325.

FIGS. 5A, 5B and 5C illustrate three perspectives of an embodiment of a moveable card construction of the present invention, in which card 340 has a first panel 341 and a second panel 346 joined along a fold line or hinge 349. The first panel 411 has an outside face 342 and an inside face 343. The second panel 346 has an inside face 344 and an outside face 345. The electronic module 100 is embedded inside the second panel 346. Die cuts in the inside face 344 of the second panel 416 are shown for the microphone 40, the audio output device 50, which in this embodiment is a speaker, a video screen 55, which is visible through the die cut, three dial switches 45, three chapter switches 46 and three multimedia switches 47, which in this embodiment are a pause switch, a rewind switch and a fast-forward switch. A die cut in the outside face 345 of the second panel 346 is shown for access to the combined power/data port 60. The main switch 110, which in this embodiment is a slide switch, is placed across the hinge 349. The electronic module 100 is activated by the main switch 110. In this embodiment, the slide tongue switch 110 activates the electronic module 110 upon the opening of the card, and deactivates the electronic module 110 by the closing of the card. One or more marketing messages may be placed on any of the four panels 342, 343, 344 and 345.

FIGS. 6A and 6B illustrate two perspectives of an embodiment of a moveable brochure-style construction of the present invention, in which brochure 360 has a first panel 361 and a second panel 369 joined along a hinge 370. The first panel 361 has an outside face 362 and an inside face 363. The two faces of panel 361 are separated by a bottom edge 364, a side edge 365 and a top edge (not shown). The second panel 369 has an inside face 366 and an outside face 371. The two faces of panel 369 are separated by a bottom edge 367, a side edge 368 and a top edge (not shown). The electronic module 100 is embedded inside the second panel 369. Die cuts in the inside face 366 of the second panel 369 are shown for the microphone 40, the audio output device 50, which in this embodiment is a speaker, a video screen 55, which is visible through the die cut, a camera 65, four dial switches 45, four chapter switches 46, four multimedia switches 47 beneath the screen 55 which in this embodiment have stop, pause, rewind and fast-forward functionality, and two multimedia switches 47 to the right of the screen 55 which in this embodiment have volume up and volume down functionality. A die cut in the inside face 363 of the first panel 361 is shown for a second video screen 55, which is visible through the die cut. A die cut in the bottom edge 367 of the second panel 369 is shown for access to the combined power/data port 60. The main switch 110, which in this embodiment is a slide switch, is placed across the hinge 370. The electronic module 100 is activated by the main switch 110. In this embodiment, the slide tongue main switch 110 activates the electronic module 100 upon the opening of the brochure, and deactivates the electronic module 100 by the closing of the brochure. One or more marketing messages may be placed on any of the four panels 362, 363, 366 and 371.

FIGS. 7A, 7B, 7C and 7D illustrate four perspectives of a tri-fold card 380. Card 380 consists of a left panel 381, a center panel 382 and a right panel 383. Left panel 381 and center panel 382 are joined along the fold line or hinge 384.

Center panel 382 and right panel 383 are joined along the fold line 385. The left panel 381 has an outside face 386 and an inside face 387. Center panel 382 has an inside face 388 and an outside face 389. The inside face 388 and outside face 389 of the central panel 382 are separated by a top edge (not shown) and a bottom edge 390. Right panel 383 has an inside face 391 and an outside face 392. The electronic module 100 is embedded in the central panel 382. Die cuts in the inside face 388 of the central panel 382 are shown for the microphone 40, the audio output device 50, which in this embodiment is a speaker, the video screen 55, which is visible through the die cut, two dial switches 45, two chapter switches 46, three multimedia switches 47 beneath the screen 55 which in this embodiment have pause, rewind and fast-forward functionality, two multimedia switches 47 to the left of the screen 55 which have volume up and volume down functionality and two multimedia switches 47 to the right of the screen 55 which have brightness up and brightness down functionality. A die cut in the outside face 389 of the center panel 382 is shown for access to the combined power/data port 60. The main switch 110, which in this embodiment is a slide switch, is placed across hinge 385. The electronic module 100 is activated by the main switch 110. In this embodiment, the slide tongue main switch 110 activates the module 100 upon the opening of the right panel, and deactivates the module 100 by the closing of the right panel. One or more marketing messages may be placed on any of the six faces 386, 387, 388, 389, 391 and 392.

Figure 8:
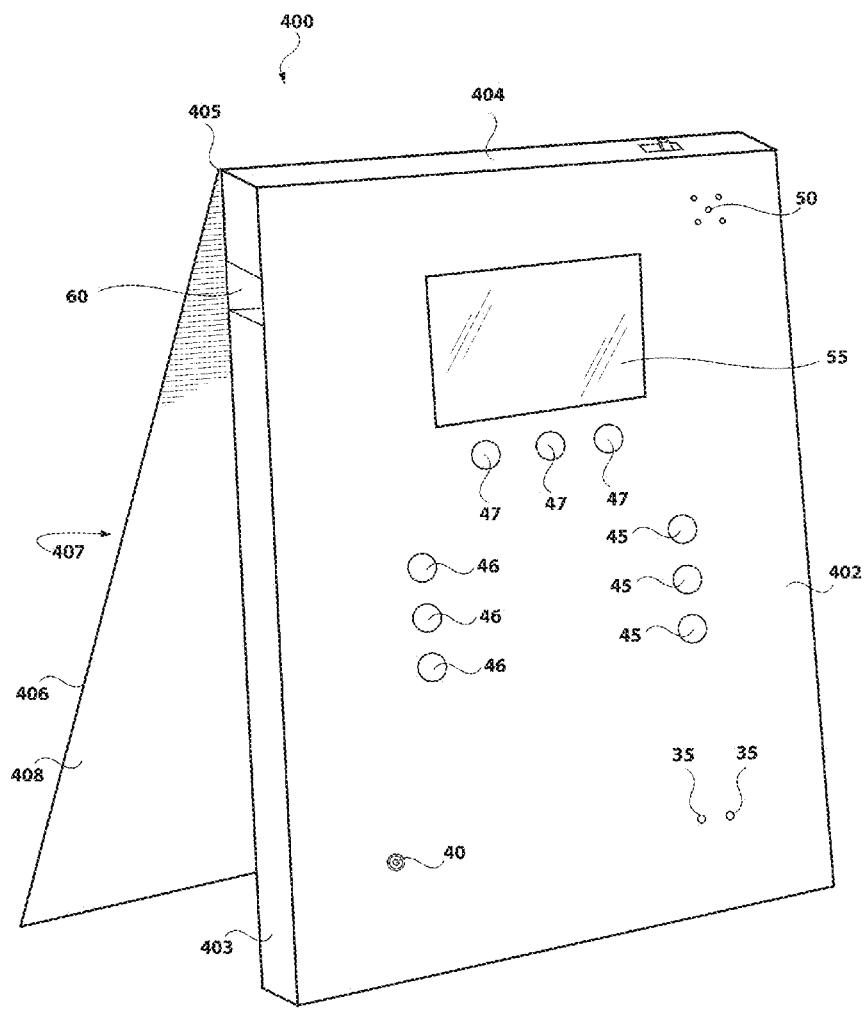
FIG. 8 illustrates an external view of a particular configuration.
Figure 9:
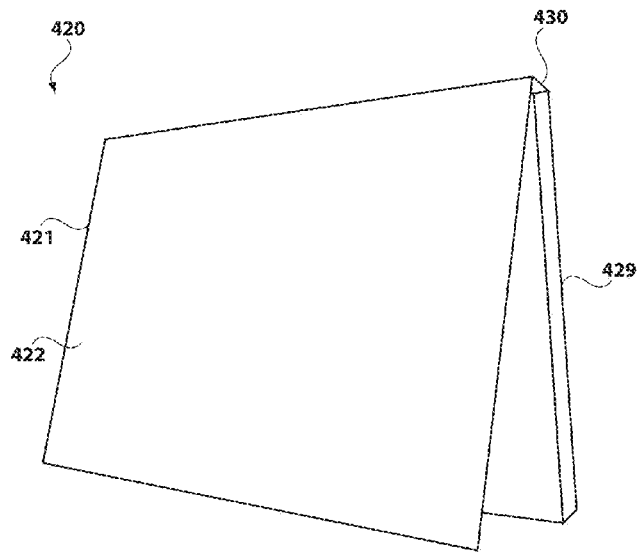
FIGS. 9A and 9B illustrate an external view of a particular configuration.
Figure 9:
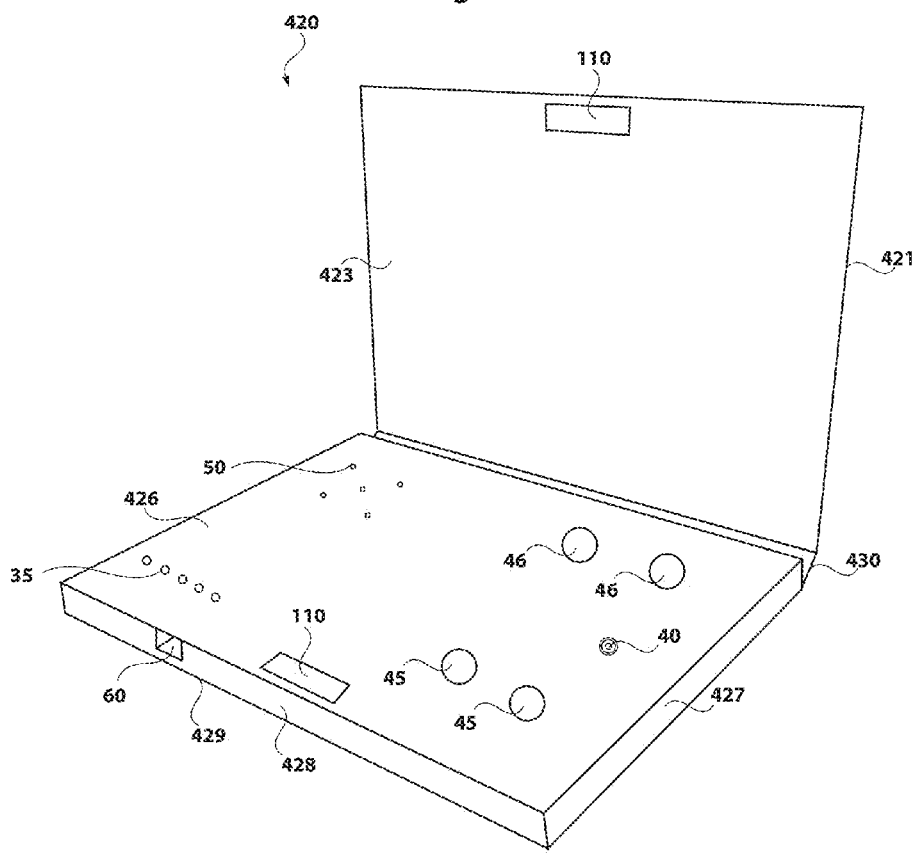
Figure 10:
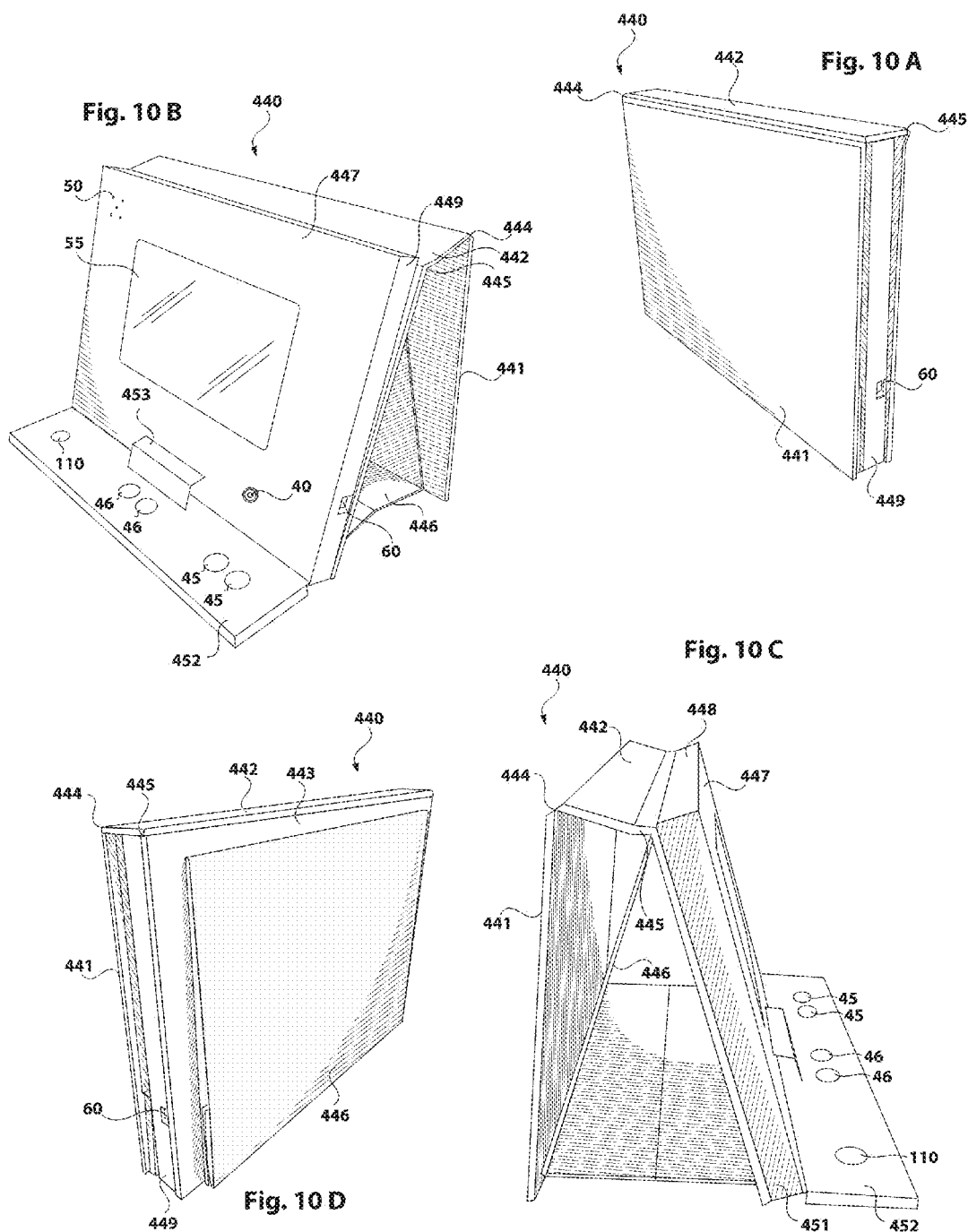
FIGS. 10A, 10B, 10C and 10D illustrate external views of a particular configuration in closed and open positions.
Figure 11:
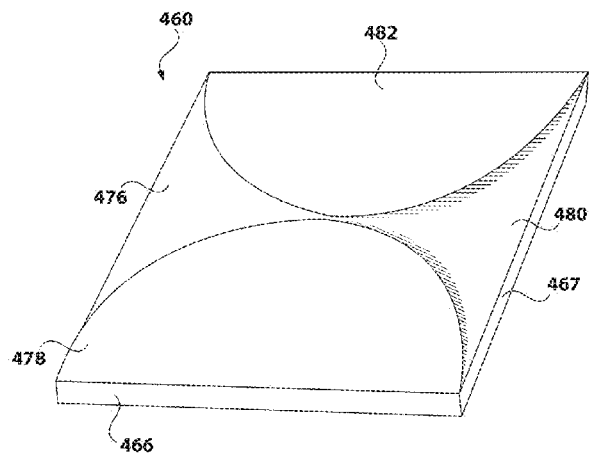
FIGS. 11A and 11B illustrate external views of a particular configuration.
Figure 11:
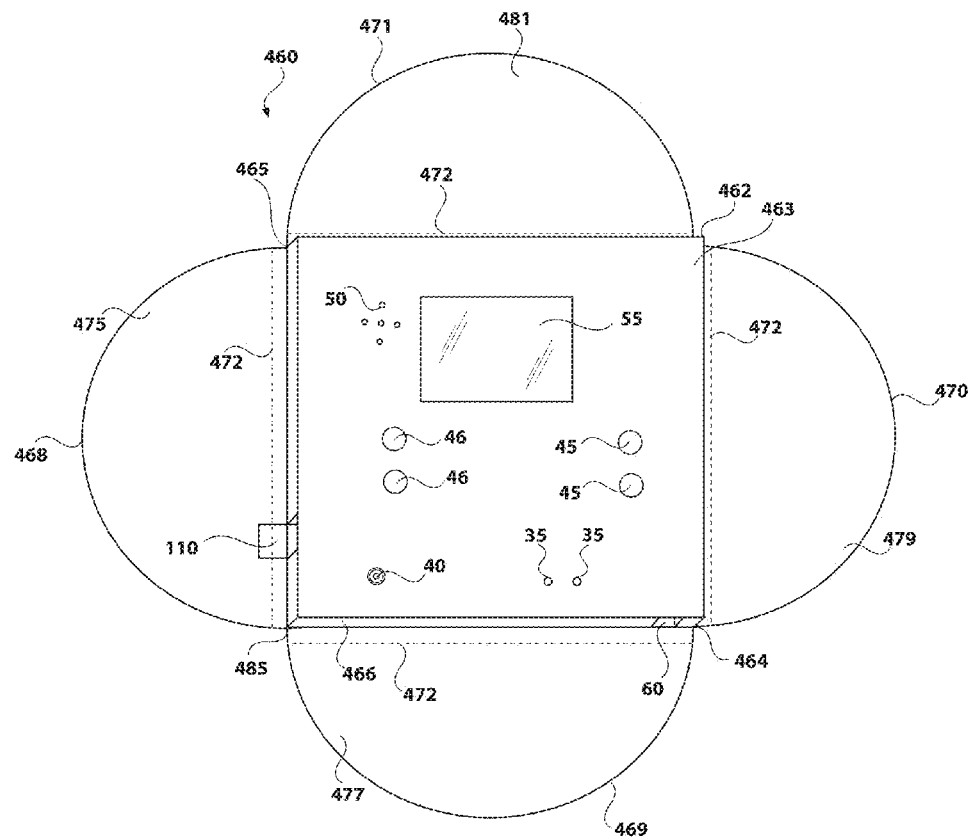
Figure 12:
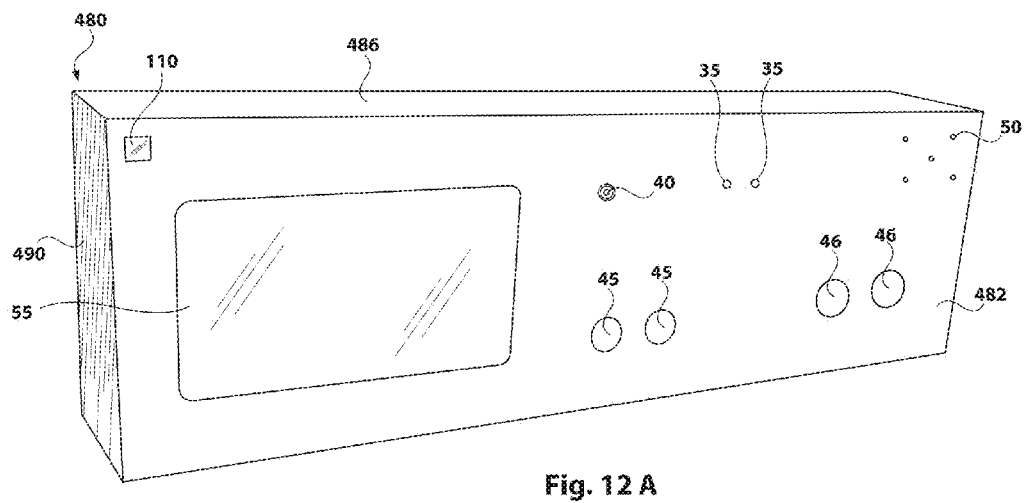
FIGS. 12A and 12B illustrate external views of a particular configuration.
Figure 12:
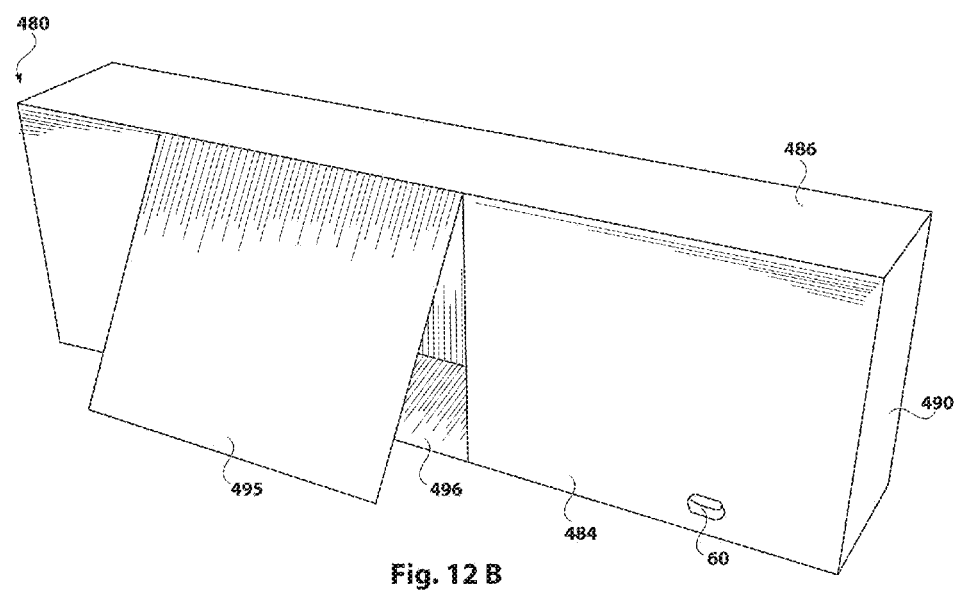

FIG. 8 illustrates an embodiment of an easel-style flat card construction of the present invention, in which the card 400 has a front 402, a back (not shown) and an edge between the two, shown as a top edge 404 and a side edge 403. A support panel 406 is attached to the top edge 404 along the hinge line 405. The support panel 406 has an outer side 407, not shown, and an inner side 408. The support panel is rotatable along the hinge line 405 from a closed position, in which the support panel 406 is adjacent to the card 400, and an open position in which the support panel 406 has rotated away from the card 400 and can support the card 400 in standing on a horizontal surface. The front 402 has die cuts for the microphone 40, an audio output device 50 which in this embodiment is a speaker, a video screen 55, two LEDs 35, three dial switches 45, three chapter switches 46 and three multimedia switches 47 beneath the screen 55 which in this embodiment have pause, rewind and fast-forward functionality. The video screen 55 is visible through the die cut. The main switch 110 is located in the top edge 404 and in this embodiment is a manually-operated toggle switch. A die cut for the combined data/power port 60 is located in the side edge 403. One or more marketing messages may be placed on any of the front panel 402 and the outer side 407 of the support panel.

FIGS. 9A and 9B illustrate two perspectives of an embodiment of a moveable book-style construction of the present invention, in which brochure 420 has a first panel 421 and a second panel 429 joined along a hinge 430. The first panel 421 has an outside face 422 and an inside face 423. The second panel 429 has an inside face 426 and an outside face 425 (not shown). The two faces of panel 429 are separated by a top edge 427, a side edge 428 and a bottom edge (not shown). The electronic module 100 is embedded inside the second panel 429. Die cuts in the inside face 426 of the second panel 369 are shown for the microphone 40, the audio output device 50, which in this embodiment is a speaker, two dial switches 45, two chapter switches 46, and five LEDs 35. A die cut in the side edge 428 of the second panel 429 is shown for access to the combined power/data port 60. The main switch 110, which in this embodiment is a two-component magnetic switch, is embedded centrally along the outside edge of panels 421 and 429. The electronic module 100 is activated by the main switch 110. In this embodiment, the magnetic main switch 110 activates the electronic module 100 upon the opening of the book, and deactivates the electronic module 100 by the closing of the book. One or more marketing messages may be placed on any of the four panels 422, 423, 426 and 425.

FIGS. 10A, 10B, 10C and 10D illustrate four perspectives, in a closed (FIGS. 10A and 10D) and an open position (FIGS. 10B and 10C), of a desktop embodiment 440 of the present invention. The desktop embodiment 440 has a front cover 441 connected to a spine 442 along a hinge 444. The spine 442 is also connected to a back panel 443 along a hinge 445. A collapsible triangular support structure 446 is attached to the back panel 443. A front panel 447 is attached to the back panel 443 separated by an edge. The edge has four sides: a top edge 448, a right edge 449, a bottom edge 450, and a left edge 451. A fold-out button panel 452 is attached to the front panel 447 along the bottom edge 450, and supported by a hinge 453. In the closed configuration, show in FIGS. 10A and 10D, the button panel 452 is folded up flush against the front panel 447 and the front cover 441 is rotated down to cover the screen panel 447 and button panel 452. Also in the closed configuration, the support structure 446 is folded flush against the back panel 443. In the open configuration, the support structure 446 pops out from the back panel 443, forming a triangular support structure. Also, the front cover 441 rotates around the back hinge 445 until the bottom edge of the front cover comes in contact with the bottom rear edge of the triangular support structure 446. One part of two-part magnetic connector is embedded in each of the support structure 446 and the front cover 441 such that when the front cover 441 has rotated into the open configuration the magnets hold the front cover against the support structure.

In its open configuration, the desktop embodiment 440 comprises a front panel 447 oriented approximately 30 degrees from vertical and a button panel 443 placed flat on a horizontal surface. The front panel has die cuts for a video screen 55, microphone 40, and an audio output device 50, which in this embodiment is a speaker. The die cut for the data/power port 60 is placed on the right edge 449. Call switches 45, chapter switches 46 and the main switch 110 are embedded in the button panel 452.

FIGS. 11A and 11B illustrate two perspectives, in two different positions, of an embodiment 460 of a moveable card construction of the present invention. A base panel 462 has a front side 463 and a back side 464 (hidden). The front side 463 and back side 464 are separated by a left edge 465, a bottom edge 466, a right edge 467 and a top edge (not shown). A left semicircular panel 468, with inside face 475 and outside face 476, is attached to the left edge 465. A bottom semicircular panel 469, with inside face 477 and outside face 478, is attached to the bottom edge 466. A right semicircular panel 470, with inside face 479 and outside face 480, is attached to the right edge. A top semicircular panel 471, with inside face 481 and outside face 482, is attached to the top edge. Each semicircular panel is creased at a distance from its connection to the base panel approximately equal to the depth of the edge, such that when each semicircular panel is folded over the base panel the semicircular panel lies flush against the edge and across the top of the base panel. The creases are shown at 472. The electronic module 100 is embedded in the base panel 462. Die cuts on the front side 463 of the base panel 462 are shown for the microphone 40, the audio output device 50, which in this embodiment is a speaker, two dial switches 45, two chapter switches 46, and two LEDs 35. The main switch 110, which in this embodiment is a slide switch, is placed across the hinge line 485 formed between the left semicircular panel 468 and the left edge 465 of the base panel 462. The electronic module 100 is activated by the main switch 110. In this embodiment, the slide tongue switch 110 activates the electronic module 100 upon the opening of the left semicircular panel 468 and deactivated by the closing thereof. One or more marketing messages may be placed on any of the inside and outside faces of the four semicircular panels and on the front side 463 of the base panel.

FIGS. 12A and 12B illustrate two perspectives of a desktop embodiment 480 of the present invention. Generally in the form of an elongated cube, the desktop embodiment 480 has a face 482, a back 484, a top 486, a bottom 488 (not shown), a left end 490, and a right end 492. The electronic module 100 is embedded inside the desktop device 480. Die cuts on the face 482 are shown for the microphone 40, the audio output device 50, which in this embodiment is a speaker, two dial switches 45, two chapter switches 46, two LEDs 35, and the main switch 110. In this embodiment the main switch 110 is a motion sensor. A die cut in the back 484 is shown for access to the combined power/data port 60. The back 484 also contains an access panel 495 to a battery storage compartment 496. The electronic module 100 is activated by the main switch 110. In this embodiment, the motion sensor main switch 110 activates the electronic module 100 by detection motion. A timer programmed into the processor 10 deactivates the module after the passage of a specified period of time. One or more marketing messages may be placed on any of the faces 482, 484, 486, 490 and 492.

FIGS. 13A, 13B and 13C illustrate three perspectives of a desktop push-button switch embodiment 500 of the present invention. A push-button switch 501 is embedded in a circular base 502 that has a bottom 503. The push-button 501 is spring-loaded above the base on springs 504 and 505. The microphone 40 is embedded in the push-button 501. Holes for the audio output device 50, which in this embodiment is a speaker, and the combined power/data port 60 are placed in the side of the base 502. A storage compartment for the power source 30, which in this embodiment is a rechargeable battery, is embedded in the bottom 503. As shown in the cut-away drawing, FIG. 13C, the main switch 110 is a lever switch connecting the push-button 501 to the base 502. As further shown in FIG. 13C, the components of the electronic module 100 are located within the base 502. The board 5, with the processor 10, memory 15 and modem 20 sits on the bottom 503, with the antenna 25 mounted to a sidewall of the base 502. The electronic module 100 is activated by sliding the main switch 110 from its off position to its on position. The push-button switch 501 is the dial switch 45 for this embodiment. One or more marketing messages may be placed on the push-button 501 and around the exterior surface of the base 502.

The one or more marketing messages placed on any surface of any embodiment of the one-touch connection wireless device may be related to the identity of the counterparty to the wireless communication and/or the content of the multimedia to provide a related marketing message to the user of the one-touch connection wireless device. In one embodiment, the related marketing message may be purely visual. In this embodiment, for example used to market products to deaf people, the marketing message applied to one or more surfaces of the device may promote the brand of the seller. The local multimedia would be a video offering a particular product or service. The wireless connection would be a text message by which the user purchased the product or service. In another embodiment, the related marketing message would combine audio and visual effects. The marketing message applied to one or more surfaces of the device may promote the brand of the seller. The local multimedia may be an advertisement for a product or service that is played both on a speaker and on a video screen. The wireless connection may be a video call pursuant to which the user may make further inquiries of the counterparty to the call regarding the products and/or services offered for sale in the video advertisement. The user of the device would then receive a three-part related marketing message: viewing the marketing message on the device, seeing and/or hearing the local multimedia, and placing the wireless communication.

I claim:

1. An apparatus comprising:
a merchandising product comprising at least a first moveable panel and a second panel; and
an electronic module and a main switch housed within the merchandising product, the electronic module comprising a processor, a memory storing at least one digital identification number and at least one multimedia file, a modem, an antenna, a power source, at least one dial switch, and an output device;
wherein the main switch is operatively connected to the first panel and the second panel such that the movement of the first panel with respect to the second panel triggers the main switch; and
wherein triggering the main switch activates the electronic module; and
wherein upon activation the electronic module plays at least the one multimedia file on the output device; and
wherein triggering the dial switch following activation of the electronic module causes the electronic module to place a wireless communication to the digital identification number.

2. The apparatus of claim 1, wherein the electronic module further comprises a microphone.

3. The apparatus of claim 1, wherein the output device further comprises a speaker.

4. The apparatus of claim 1, wherein the output device further comprises a video screen.

5. The apparatus of claim 1, wherein the electronic module collects and sends analytics.

6. The apparatus of claim 1, wherein a marketing message is placed on at least one external surface of the merchandising product.

7. The apparatus of claim 1, wherein the wireless communication is a telephone call.

8. The apparatus of claim 1, wherein the wireless communication is a text message.

9. The apparatus of claim 1, wherein the wireless communication is e-mail.

10. The apparatus of claim 1, wherein the wireless communication is data.

11. A method of receiving a related marketing message, comprising the steps of:
(a) viewing a marketing message applied to an external surface of a merchandising product comprising at least a first moveable panel and a second panel, the merchandising product further comprising an electronic module and a main switch housed within the merchandising product, the electronic module comprising a processor, a memory storing at least one digital identification number and at least one multimedia file, a modem, an antenna, a power source, at least one dial switch, and an output device wherein the main switch is operatively connected to the first panel and the second panel such that the movement of the first panel with respect to the second panel triggers the main switch, (b) activating the electronic module by moving the first panel with respect to the second panel;

(c) receiving the contents of the multimedia file via the output device, and (d) and placing a wireless communication by triggering the dial switch.

12. The method of claim 11, wherein the electronic module further comprises a microphone.

13. The method of claim 11 wherein the output device further comprises a speaker.

14. The method of claim 11 wherein the output device further comprises a video screen.

15. The method of claim 11, wherein the electronic module collects and sends analytics.

16. The method of claim 11, wherein the wireless communication is a telephone call.

17. The method of claim 11, wherein the wireless communication is a text message.

18. The method of claim 11, wherein the wireless communication is an email.

19. The method of claim 11, wherein the wireless communication is data.

* * * * *